US012117373B2

(12) United States Patent
Waki et al.

(10) Patent No.: US 12,117,373 B2
(45) Date of Patent: Oct. 15, 2024

(54) TESTING APPARATUS OF UTILITY POLE

(71) Applicant: NIPPON TELEGRAPH AND TELEPHONE CORPORATION, Tokyo (JP)

(72) Inventors: Masaki Waki, Musashino (JP); Ryoichi Kaneko, Musashino (JP); Hiroaki Tanioka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 347 days.

(21) Appl. No.: 17/775,819

(22) PCT Filed: Nov. 20, 2019

(86) PCT No.: PCT/JP2019/045425
§ 371 (c)(1),
(2) Date: May 10, 2022

(87) PCT Pub. No.: WO2021/100139
PCT Pub. Date: May 27, 2021

(65) Prior Publication Data
US 2022/0381652 A1    Dec. 1, 2022

(51) Int. Cl.
*G01M 99/00*    (2011.01)
(52) U.S. Cl.
CPC .............................. *G01M 99/007* (2013.01)
(58) Field of Classification Search
CPC .................................................. G01M 99/007
USPC ...................................................... 73/862.381
See application file for complete search history.

(56) References Cited

U.S. PATENT DOCUMENTS 11,365,556 B1 *  6/2022  Anderson ........... E04H 12/2238

FOREIGN PATENT DOCUMENTS

| CN | 102435492 A | * | 5/2012 | .......... G01M 5/0058 |
| JP | 20192859 A |  | 1/2019 | |

OTHER PUBLICATIONS

Kuang. Machine Translation of CN-102435492-A. Published May 2012. Translated Jun. 2024. (Year: 2012).*

* cited by examiner

*Primary Examiner* — Walter L Lindsay, Jr.
*Assistant Examiner* — Philip T Fadul

(57) ABSTRACT

A utility pole testing apparatus includes three or more utility poles including a first utility pole, a second utility pole, and a third utility pole, a support line that is stretched between the first utility pole and the second utility pole, and is also stretched between the second utility pole and the third utility pole, a rail extended in a direction that intersects both a direction in which the three or more utility poles extend and a direction in which the support line is stretched between the first utility pole and the second utility pole, and a carriage configured to support the third utility pole, the carriage being movably provided along the rail together with the third utility pole.

8 Claims, 6 Drawing Sheets

TESTING APPARATUS OF UTILITY POLE

CROSS-REFERENCE TO RELATED APPLICATIONS

This application is a 371 U.S. National Phase of International Application No. PCT/JP2019/045425, filed on Nov. 20, 2019. The entire disclosure of the above application is incorporated herein by reference.

TECHNICAL FIELD

The present invention relates to a utility pole testing apparatus.

BACKGROUND ART

The existing apparatus for detecting vibrations applied to a utility pole and evaluating the strength of the utility pole based on the detected vibration data has been known as a utility pole testing apparatus (see PTL 1).

CITATION LIST

Patent Literature

PTL 1: JP 2019-002859 A

SUMMARY OF THE INVENTION

Technical Problem

In the related art, in testing a strength and the like of a utility pole, a single utility pole for testing is installed on the ground to perform tests on the single utility pole. However, an aerial line facility constituted by a utility pole, a branch wire, a support line that supports an aerial line, and the like has complicated and diverse situations such as a line angle (an angle of the support line spanning between the utility poles), a branch line direction, a tension difference between support lines according to an installation place. Moreover, various external loads are applied to each utility pole constituting the aerial line facility due to weather conditions such as wind and snow.

For this reason, there is a need to develop a utility pole testing apparatus that can perform testing in consideration of various external loads to be applied to a utility pole.

Then, an object of the present invention is to provide a utility pole testing apparatus capable of performing testing in consideration of various external loads to be applied to a utility pole.

Means for Solving the Problem

In order to solve the problems described above, a utility pole testing apparatus according to the present invention includes: three or more utility poles including a first utility pole, a second utility pole, and a third utility pole, a support line that is stretched between the first utility pole and the second utility pole and is also stretched between the second utility pole and the third utility pole; a rail extended in a direction that intersects both a direction in which the three or more utility poles extend and a direction in which the support line is stretched between the first utility pole and the second utility pole, and a carriage that supports the third utility pole and is movably provided along the rail together with the third utility pole.

Effects of the Invention

According to the present invention, testing can be performed in consideration of various external loads to be applied to a utility pole.

DESCRIPTION OF EMBODIMENTS

Figure 1:
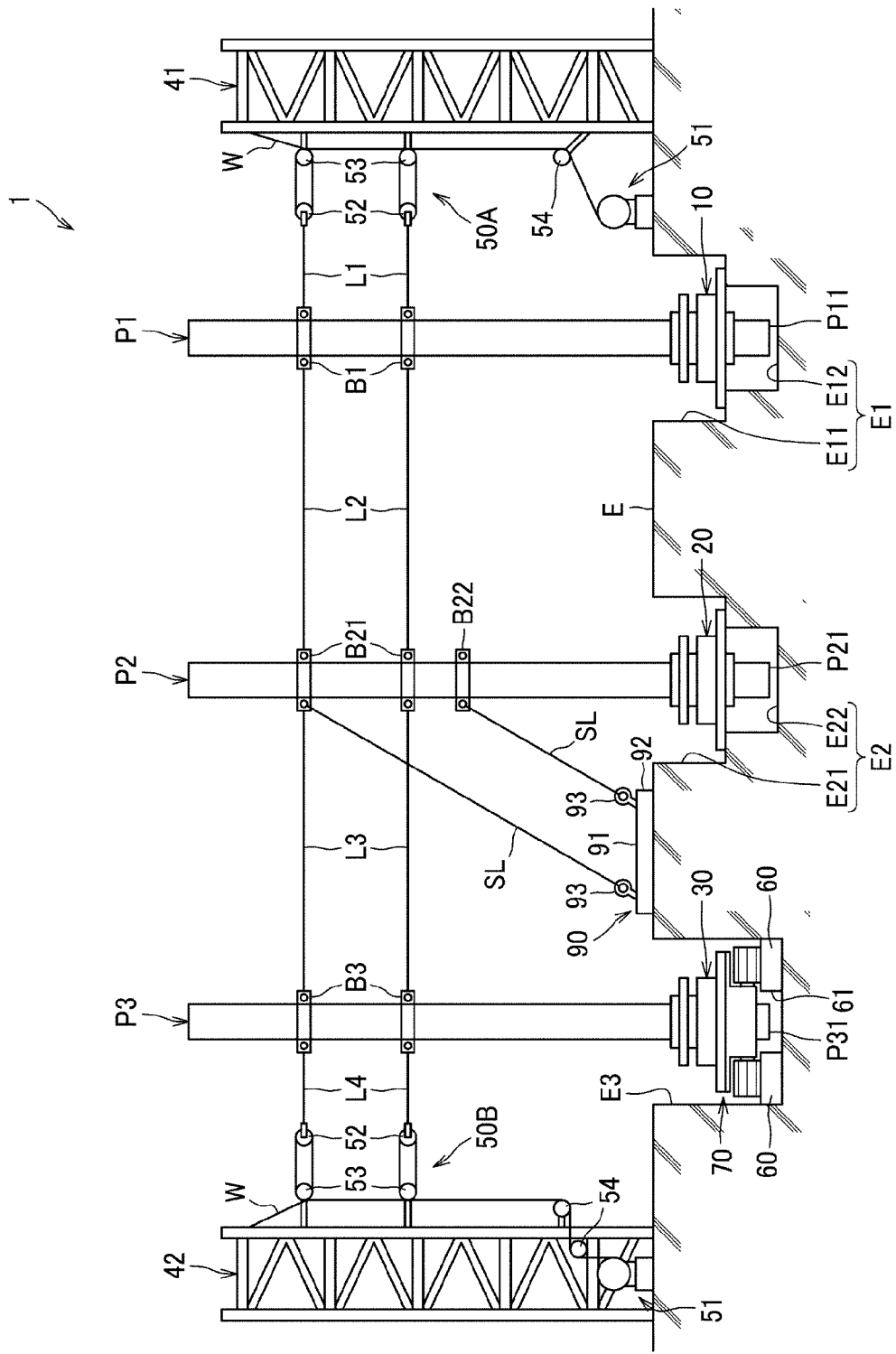
FIG. 1 is a side view illustrating a utility pole testing apparatus according to an embodiment.

A utility pole testing apparatus according to the present embodiment includes: three or more utility poles including a first utility pole, a second utility pole, and a third utility pole, a support line that is stretched between the first utility pole and the second utility pole and is also stretched between the second utility pole and the third utility pole; a rail extended in a direction that intersects both a direction in which the three or more utility poles extend and a direction in which the support line is stretched between the first utility pole and the second utility pole, and a carriage that supports the third utility pole and is movably provided along the rail together with the third utility pole. In this way, because moving the carriage along the rail allows the position of the third utility pole to be changed, a line angle can be changed. Therefore, testing can be performed by using the utility pole testing apparatus in consideration of external loads to be applied to the utility poles.

A first support device supporting the first utility pole and a second support device supporting the second utility pole may also be provided. Further, the first support device and the second support device may be fixed to the ground E. According to this configuration, the cost required for the utility pole testing apparatus is controlled compared to a case where the rail and the carriage are provided on each of the two or more support devices.

Additionally, a first frame body in which a support line is stretched between the first utility pole and the first frame body, and a second frame body in which a support line is stretched between the third utility pole and the second frame body may be provided. Furthermore, the second frame body may be extended along the rail. According to this configuration, even when the third utility pole movable along the rail is installed at any position, an operation of attaching a portion of the support line connected to the third utility pole to the second frame body can be easily performed.

In addition, the utility pole testing apparatus according to the present embodiment may include a first tensioning apparatus that applies tension to a portion of the support line connected to the first utility pole, and a second tensioning apparatus that applies tension to a portion of the support line connected to the third utility pole. As a result, tension is favorably applied to each of the support lines of the utility poles.

In addition, each of the support devices may tiltably support the corresponding utility pole to be supported of the utility poles and also support the utility poles to be supported rotatably by 360° about an axis in a direction in which the utility poles to be supported extend. According to this configuration, the testing can be performed on the strength of the first to third utility poles in a state in which any of the first to third utility poles are tilted in any direction of 360°.

In addition, each of the support devices may support the utility poles to be supported in a state in which a lower end portion of the corresponding utility pole to be supported of the utility poles is protruded downward from the corresponding support device. According to this configuration, each of the support devices can favorably support the utility pole to be supported, compared to a case in which, for example, the lower end portion of the utility pole is supported by the support device.

In addition, inside a hole on a lower side of each of the support devices, the lower end portion of the utility pole to be supported may be disposed with a gap between a bottom surface and the lower end portion. According to this configuration, when the utility pole to be supported is tilted by each of the support devices, interference of the lower end portion of the utility pole to be supported with an inner surface of the hole is reduced.

In addition, a third support device that supports the third utility pole as a utility pole to be supported is provided, and a cavity may be formed by a surface defined by the rail on the lower side of the third support device. According to this configuration, even when the third utility pole is moved along the rail by the carriage, interference between the lower end portion of the third utility pole and the surface defining the cavity is minimized.

Furthermore, the strength of each of the first and second frame bodies relative to the load may be higher than that of each of the utility poles. According to this configuration, even when a load that breaks the utility poles is applied, the first frame body and the second frame body are not broken.

The utility pole testing apparatus may include a sensor that detects a load to be applied to a utility pole to be measured, which is any one of the utility poles and may include a measuring device that measures the strength of the utility pole to be measured based on the detection result from the sensor. According to this configuration, the strength of the utility pole to be measured can be measured.

Hereinafter, an embodiment of the present invention will be described in detail while appropriately referring to the drawings.

As illustrated in FIG. 1, a utility pole testing apparatus 1 includes a first support device 10, a second support device 20, a third support device 30, a first frame body 41, a second frame body 42, a first tensioning apparatus 50A, a second tensioning apparatus 50B, a rail 60, and a carriage 70.

The first support device 10 is a device that supports a first utility pole P1 as a utility pole to be supported and is fixed to the ground E. The first utility pole P1 extends upward from the first support device 10 in a vertical direction. The first support device 10 is disposed in a first hole E1 formed to be recessed downward in the vertical direction from the ground E. A cavity is formed on a lower side of the first support device 10. The first support device 10 is fixed to a basic structure mounted in the first hole E1. The basic structure is formed from concrete, a metal, or the like, for example. Note that the basic structure is not illustrated in FIG. 1.

The first hole E1 has a large diameter hole E11 and a small diameter hole E12. The large diameter hole E11 includes a bottom surface. The large diameter hole E11 is recessed downward in the vertical direction from the ground E and is formed with a predetermined diameter. The small diameter hole E12 includes a bottom surface. The small diameter hole E12 is formed to be further recessed downward in the vertical direction from the bottom surface of the large diameter hole E11. The small diameter hole E12 forms a part of the cavity formed under the lower side of the first support device 10. A radial dimension of the small diameter hole E12 is smaller than a radial dimension of the large diameter hole E11. In a certain example, the large diameter hole E11 and the small diameter hole E12 are concentrically disposed.

The first support device 10 is provided on the upper side of the bottom surface of the large diameter hole E11. For this reason, the first support device 10 is supported by the bottom surface of the large diameter hole E11. The small diameter hole E12 is formed under the lower side of the first support device 10. A lower end portion P11 of the first utility pole P1 protrudes further downward from a lower section of the first support device 10. The lower end portion P11 is disposed in the small diameter hole E12 with a gap formed between the lower end portion P11 and the bottom surface of the small diameter hole E12. As will be described below, a gap is formed between the lower end portion P11 and the bottom surface of the small diameter hole E12 even when the first utility pole P1 is tilted with respect to the vertical direction. A gap is formed between the lower end portion P11 and the bottom surface of the small diameter hole E12 even when the first utility pole P1 is tilted to the maximum with respect to the vertical direction.

The second support device 20 is a device that supports the second utility pole P2 as a utility pole to be supported and is fixed to the ground E in the same manner as the first support device 10. The second support device 20 is disposed in a second hole E2 formed in the same manner as the first hole E1 described above. Similar to the first hole E1, the second hole E2 includes a large diameter hole E21 and a small diameter hole E22. The large diameter hole E21 and the small diameter hole E22 are the same as the large diameter hole E11 and the small diameter hole E11, respectively. Similar to the lower end portion P11, the lower end portion P21 of the second utility pole P2 protrudes further downward from the lower section of the second support device 20. Therefore, similar to the first utility pole P1, a gap is formed between the lower end portion P21 and the bottom surface of the small diameter hole E22 even when the second utility pole P2 is tilted with respect to the vertical direction.

The third support device 30 is a device that supports the third utility pole P3 as a utility pole to be supported. The third support device 30 is disposed in a third hole E3 formed in the ground E along with the rail 60 and the carriage 70. The hole E3 is recessed downward in the vertical direction in the ground E. The rail 60 is provided on the bottom surface of the hole E3. The rail 60 is extended in a direction intersecting the vertical direction (a first direction) and a direction in which the first utility pole P1 and the second utility pole P2 are joined (a second direction) (a third direction). In a certain example, two rails 60 are provided in parallel on the bottom surface of the hole E3. A gap defined by the two rails 60 is formed between the two rails 60. The gap formed between the two rails 60 is formed on the lower side of the third support device 30 to form a hole 61 with a bottom surface. The bottom surface of the hole 61 is formed by a part of the bottom surface of the third hole E3.

The third support device 30 is attached to the carriage 70 from the upper side in the vertical direction. The carriage 70 is movably provided on the rails 60. That is, the carriage 70, the third support device 30, and the third utility pole P3 are arranged on the rails 60 in that order.

The lower end portion P31 of the third utility pole P3 protrudes downward from the carriage 70 in the vertical direction. The lower end portion P31 is disposed in the hole 61 with a gap formed between the lower end portion P31 and the hole 61. As will be described below, a gap is formed between the lower end portion P31 of the third utility pole P3 and the bottom surface of the hole 61 even when the third utility pole P3 is tilted with respect to the vertical direction. A gap is formed between the lower end portion P31 of the third utility pole P3 and the bottom surface of the hole 61 even when the third utility pole P3 is fully tilted with respect to the vertical direction.

The first frame body 41 is disposed in the vicinity of the first utility pole P1. The first frame body 41 is disposed on a side of the first utility pole P1 opposite to the second utility pole P2, and the first utility pole P1 is disposed between the first frame body 41 and the second utility pole P2. In a certain example, the first frame body 41 is constituted by a steel frame. The first frame body 41 is attached to the first utility pole P1 via the first tensioning apparatus 50A and two first support lines L1. The first frame body 41 is connected to the first tensioning apparatus 50A. The two first support lines L1 are stretched between the first tensioning apparatus 50A and the first utility pole P1. One ends of the two first support lines L1 are attached to the first utility pole P1. The other ends of the two first support lines L1 are attached to the first tensioning apparatus 50A. In a certain example, the first utility pole P1 is provided with two utility pole bands BT. The two utility pole bands B1 are provided in the first utility pole P1 and separated from each other in the vertical direction.

The first tensioning apparatus 50A is an apparatus that applies tension to the first support lines L1. The first tensioning apparatus 50A includes an electric winch 51, two movable pulleys 52, two first fixed pulleys 53, a second fixed pulley 54, and a wire W. The electric winch 51 is provided on the ground E. The two movable pulleys 52 each have one wheel. The two movable pulleys 52 are each connected to a corresponding one of the other ends of the two first support lines L1. The first fixed pulley 53 and the second fixed pulley 54 are connected to the first frame body 41. The two first fixed pulleys 53 each have two wheels. The second fixed pulley 54 has one wheel. The second fixed pulley 54 is disposed below the two first fixed pulleys 53 in the vertical direction.

In the first tensioning apparatus 50A, the wire W is drawn from the electric winch 51 and wound around the wheel of the second fixed pulley 54. Next, the wire W is wound around a first wheel included in the first fixed pulley 53 disposed on the lower side of the two first fixed pulleys 53. Then, the wire W is wound around a wheel of the movable pulley 52 disposed on the lower side of the two movable pulleys 52. Next, the wire W is wound around the second wheel included in the first fixed pulley 53 disposed on the lower side of the two first fixed pulleys 53. Then, the wire W is wound around a first wheel included in the first fixed pulley 53 disposed on the upper side of the two first fixed pulleys 53. The wire W is wound around a wheel of the movable pulley 52 disposed on the upper side of the two movable pulleys 52. Then, the wire W is rewound and drawn upward to the second wheel included in the first fixed pulley 53 disposed on the upper side of the two first fixed pulleys 53. The other end of the wire W is connected to the first frame body 41 disposed above the two first fixed pulleys 53 in the vertical direction.

The first utility pole P1 is connected to the second utility pole P2 via two second support lines L2. The second utility pole P2 is connected to the third utility pole P3 via two third support lines L3. In other words, the two second support lines L2 are stretched between the first utility pole P1 and the second utility pole P2. The two third support lines L3 are stretched between the second utility pole P2 and the third utility pole P3. Note that no support line is stretched between the first utility pole P1 and the third utility pole P3.

In the example illustrated in FIG. 1 and the like, two utility pole bands B1 are provided on the first utility pole PT. The two utility pole bands B1 are disposed on the first utility pole P1 and separated from each other in the vertical direction. Each of the two utility pole bands B1 is connected to one end of the corresponding one of the two first support lines L1. In this case as well, each of the two movable pulleys 52 is connected to the other end of the corresponding one of the two first support lines L1. The two first fixed pulleys 53 are each disposed at the same or substantially the same position as the corresponding one of the two utility pole bands B1 in the vertical direction. For this reason, the two first support lines L1 are disposed parallel to, or generally parallel to, each other.

In this case, two utility pole bands B21 are also provided on the second utility pole P2. The two utility pole bands B21 are disposed on the second utility pole P2 and separated from each other in the vertical direction. Each of the two utility pole bands B21 is disposed in the same or substantially the same position as the corresponding one of the two utility pole bands B1 in the vertical direction.

Each of the two utility pole bands B21 is connected to one end of the corresponding one of the two second support lines L2. The other end of each of the two second support lines L2 is connected to the corresponding one of the two utility pole bands B1 on a side opposite to the side to which the first support line L1 is connected. Each of the two utility pole bands B21 is disposed at the same or substantially the same position as the corresponding one of the two utility pole bands B1 in the vertical direction. For this reason, the two second support lines L2 are disposed parallel to or generally parallel to each other.

Two utility pole bands B3 are also provided on the third utility pole P3. The two utility pole bands B3 are disposed on the third utility pole P3 and separated from each other in the vertical direction. Each of the two utility pole bands B3 is disposed at the same or substantially the same position as the corresponding one of the two utility pole bands B21 in the vertical direction.

Each of the two utility pole bands B3 is connected to one end of the corresponding one of the two third support lines L3. The other end of each of the two third support lines L3 is connected to the corresponding one of the two utility pole bands B21 on a side opposite to the side to which the second support line L2 is connected. Each of the two utility pole bands B3 is disposed at the same or substantially the same position as the corresponding one of the two utility pole bands B21 in the vertical direction. For this reason, the two third support lines L3 are disposed parallel to, or generally parallel to, each other.

The second frame body 42 is disposed in the vicinity of the third utility pole P3. The second frame body 42 is disposed on a side of the third utility pole P3 opposite to the second utility pole P2, and the third utility pole P3 is disposed between the second utility pole P2 and the second frame body 42. In a certain example, the second frame body 42 is constituted by a steel frame. The second frame body 42 is attached to the third utility pole P3 via a second tensioning apparatus 50B and two fourth support lines L4. The second frame body 42 is connected to the second tensioning apparatus 50B.

The two fourth support lines L4 are stretched between the second tensioning apparatus 50B and the third utility pole P3. One end of each of the two fourth support lines L4 is attached to the third utility pole P3. The other end of each of the two fourth support lines L4 is attached to the second tensioning apparatus 50B. When two utility pole bands B3 are provided on the third utility pole, one end of each of the two fourth support lines L4 is attached to corresponding one of the utility pole bands B3.

The second tensioning apparatus 50B is an apparatus that applies tension to the fourth support line L4. The second tensioning apparatus 50B is the same as the first tensioning apparatus except that the second tensioning apparatus 50B includes two second fixed pulleys 54. In a certain example, the number of the second fixed pulleys 54 may be one due to the position at which the electric winch 51 is disposed. Note that the support lines L1 to L4 are wires that support a communication cable. The support lines L1 to L4 may be, for example, a suspension wire that supports a self-supporting cable, or a suspension wire that supports a non-self-supporting cable via a cable ring.

Figure 5:
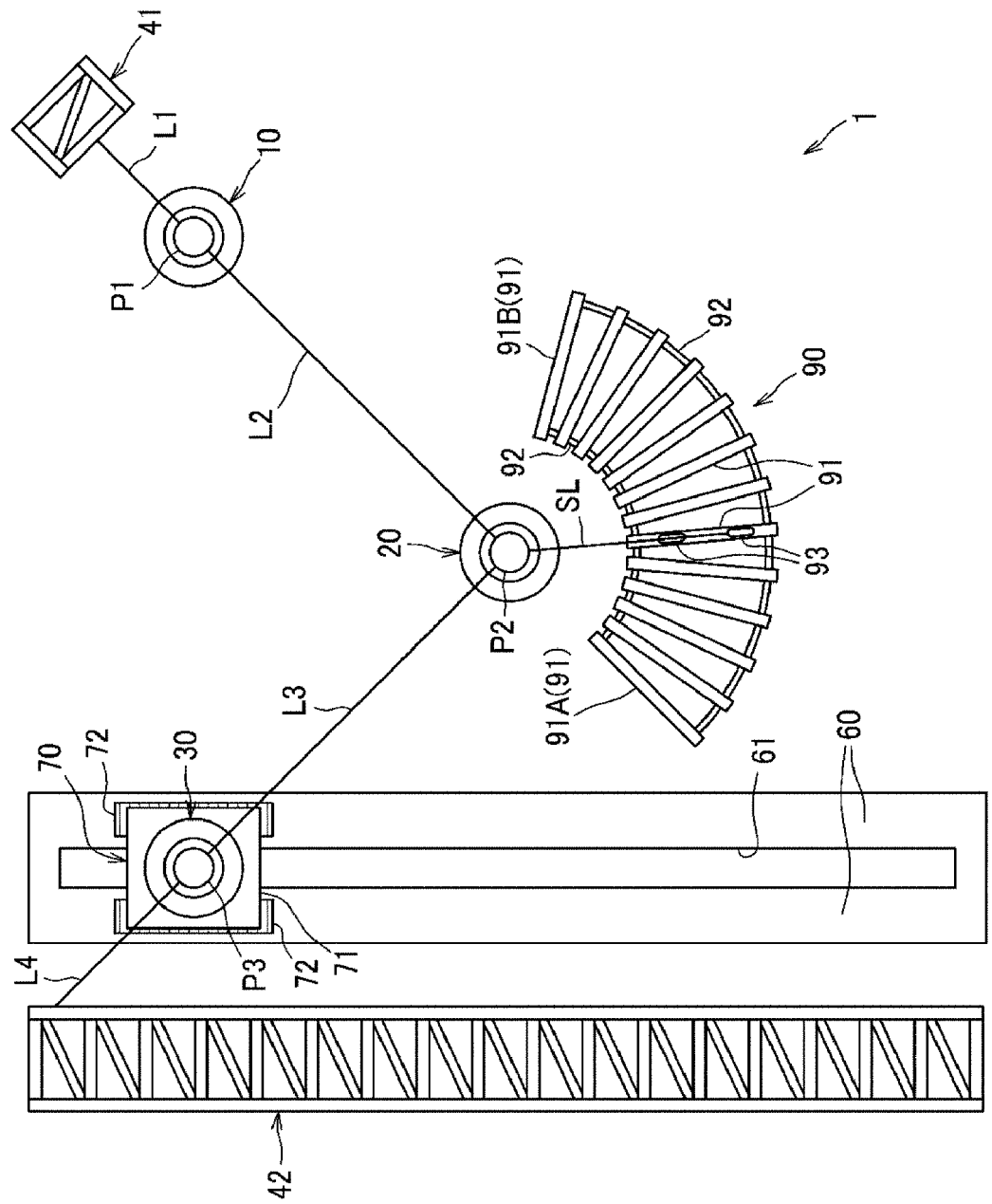
FIG. 5 is a plan view illustrating the carriage provided in the utility pole testing apparatus according to the embodiment in a state in which the carriage is moved from a position of FIG. 2.

The second utility pole P2 is further provided with a utility pole band B22. The utility pole band B22 is disposed below the other utility pole band B21 in the vertical direction. The utility pole band B21, which is provided on the uppermost side in the vertical direction, and the utility pole band B22 are each connected to a branch wire fixing structure 90 via a branch line SL. The branch wire fixing structure 90 is installed on the ground E and is disposed in the vicinity of the second utility pole P2. The branch wire fixing structure 90 includes a plurality of support beam members 91 and a plurality of coupling members 92. A hook member 93 for a branch wire can be attached to each of the support beam members 91. In a certain example, the branch line SL is fixed to one of the support beam members 91 via the hook member 93 for the branch line. Note that, in FIGS. 2 and 5, the tensioning apparatuses 50A and 50B, and the like are omitted.

Figure 2:
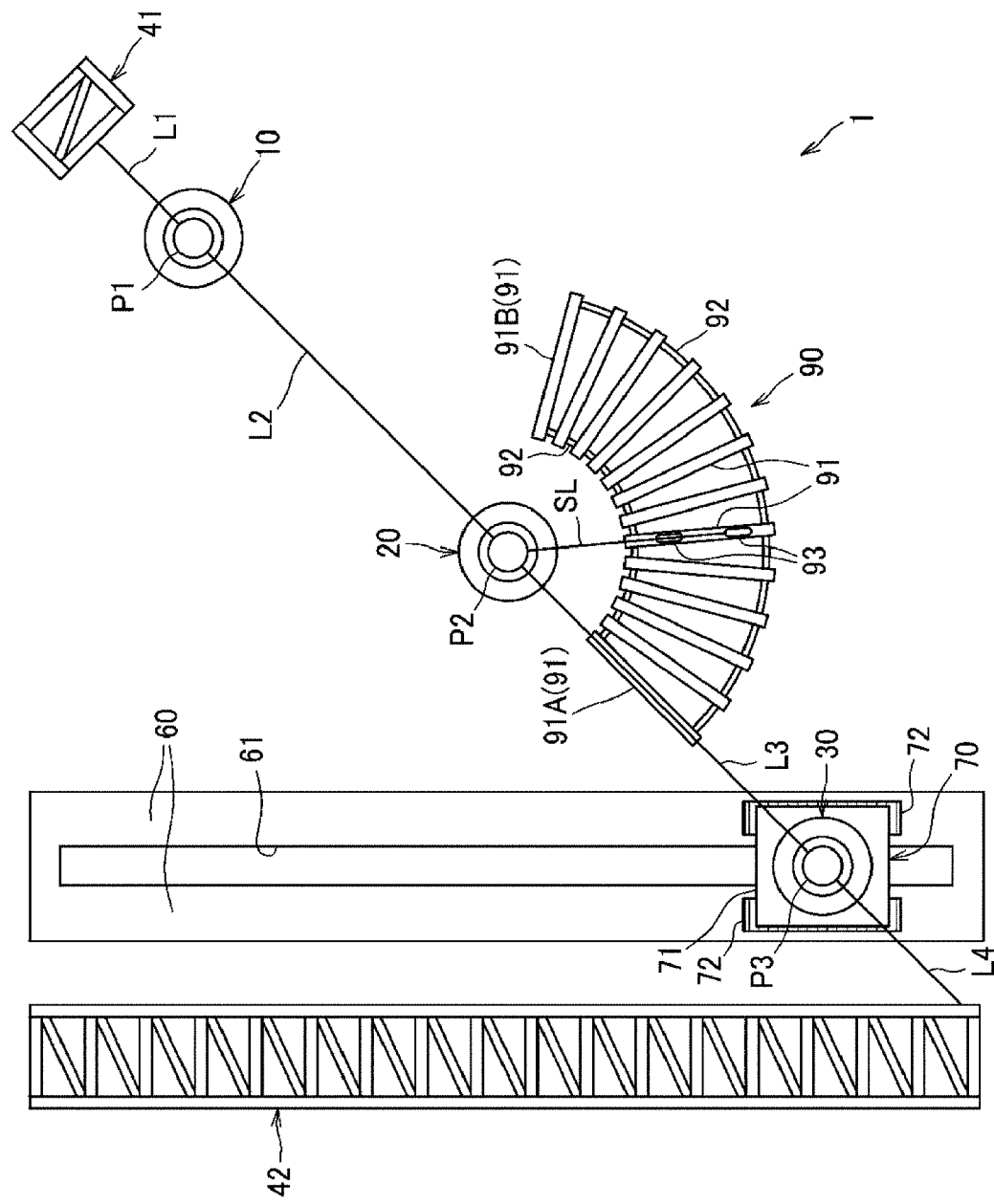
FIG. 2 is a plan view illustrating the utility pole testing apparatus according to the embodiment.

FIG. 2 is a plan view illustrating the utility pole testing apparatus. The plurality of support beam members 91 are elongated members. One end of each of the plurality of support beam members 91 is disposed in the vicinity of the second utility pole P2. The other end of each of the plurality of support beam members 91 is disposed on the opposite side of the one end in the vicinity of the second utility pole P2. That is, one ends of the plurality of support beam members 91 are disposed between the other ends of the plurality of support beam members 91 and the second utility pole P2. The plurality of support beam members 91 are spaced apart from each other in a circumferential direction around the second utility pole P2.

The coupling members 92 are provided below the plurality of support beam members 91. Accordingly, the plurality of support beam members 91 are coupled together by the coupling members 92. The coupling member 92 is formed in a circular arc or a substantially circular arc shape around the second utility pole P2. In a certain example, the coupling member 92 couples one end of each of the plurality of support beam members 91. The coupling member 92 connects the other end of each of the plurality of support beam members 91.

A support beam member 91A disposed at one end is disposed in the second direction. In a state in which the utility poles P1 to P3 are aligned in a linear or substantially linear manner in the second direction, the support beam member 91A is disposed in the second direction and below the third support line L3 in the vertical direction. As described above, the plurality of support beam members 91 other than the support beam member 91A are disposed in an arcuate or substantially arcuate shape in a direction away from the rail 60. In a certain example, an angle between the support beam member 91A disposed at one end and the support beam member 91B disposed at the other end is 120°.

As described above, the rail 60 extends in the third direction. In addition, the second frame body 42 is extended in a direction in which the rail 60 extends. In a certain example, the angle formed between the second direction and the third direction is 45°. In the following description, the third direction is also referred to as a "forward/rearward direction", and a direction intersecting the forward/rearward direction and the first direction (vertical direction) is also referred to as a "leftward/rightward direction". The two rails 60 are spaced apart from each other in the leftward/rightward direction as described above. A cavity defined by being sandwiched by the two rails 60 is formed between the two rails 60. As described above, the hole 61 forms a part of the cavity formed in the lower side of the third support device.

Figure 3A:
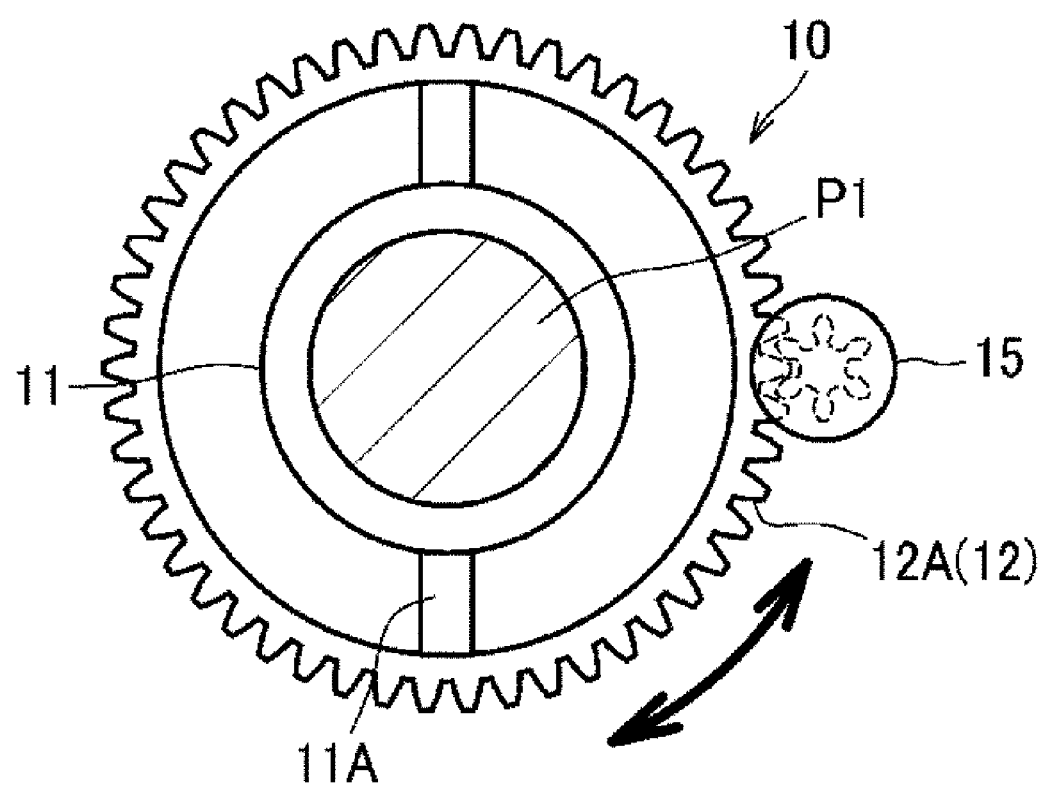
FIG. 3A is a plan view illustrating a first support device and a second support device provided in the utility pole testing apparatus according to the embodiment.
Figure 3B:
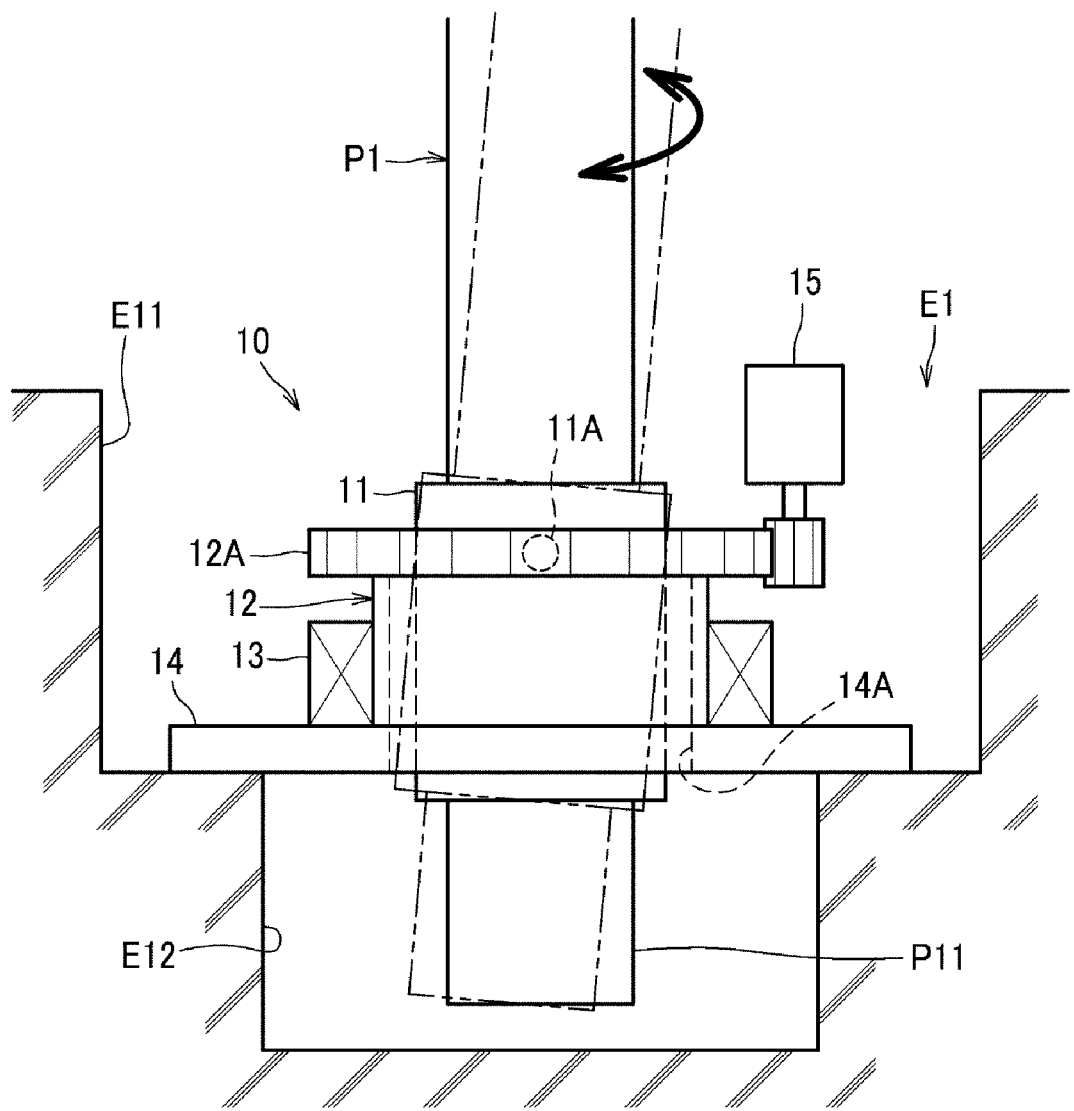
FIG. 3B is a side view illustrating the first support device and the second support device provided in the utility pole testing apparatus according to the embodiment.

Next, each of the support devices 10 to 30 will be described. Note that the support devices 10 to 30 have the same structure, and thus the first support device 10 will be described below. FIG. 3A is a plan view illustrating the first support device 10. In addition, FIG. 3B is a side view illustrating the first support device 10. The first support device 10 tiltably supports the first utility pole P1, which is a utility pole to be supported. The first support device 10 rotatably supports the first utility pole P1 about an axis in the direction in which the first utility pole P1 extends. The first support device 10 includes a first support member 11, a second support member 12, a bearing 13, a base member 14, and a motor 15.

The first support member 11 is attached to the first utility pole P1. The first support member 11 is attached to the first utility pole P1 from the outer peripheral side of the first utility pole P1 and supports the first utility pole P1. A cavity is formed in the second support member 12. In a certain example, the second support member 12 is formed in a cylindrical or substantially cylindrical shape. The second support member 12 is attached to the first support member 11 from the outer peripheral side of the first support member 11. That is, the first support member 11 is inserted into the cavity of the second support member 12. A gear 12A is formed on the outer circumferential surface of the second support member 12 in the circumferential direction. A driving force of the motor 15 is transmitted to the gear 12A.

A shaft 11A is attached to the second support member 12. The shaft 11A is attached into the cavity of the second support member. The shaft 11A traverses the cavity of the second support member 12 and passes through the first support member 11 inserted into the cavity of the second support member 12. As a result, the second support member 12 tiltably supports the first support member 11 via the shaft 11A. The second support member 12 can hold the first support member 11 in a state in which the first support member 11 is tilted from the first direction. In this case, the first utility pole P1 is also held while being tilted from the first direction. Note that, for example, a hydraulic cylinder or the like may be used as a member configured to change an inclination of the first support member 11 and holding the changed inclination.

The bearing 13 is attached to the second support member 12 from the outer circumferential side of the second support member 12. The second support member 12 is inserted into a cavity formed in the bearing 13. For this reason, the second support member 12 is rotatable with respect to the bearing 13.

The base member 14 is disposed below the second support member 12. The base member 14 is disposed below the bearing 13. The base member 14 contacts the second support member 12 and the bearing 13 from the lower side. For this reason, the base member 14 can support the second support member 12 and the bearing 13 from the lower side. In a certain example, the base member 14 is provided on the bottom surface of the large diameter hole E11 formed in the ground E. That is, the first support device 10 is provided on the bottom surface of the large diameter hole E11. For this reason, the first support device 10 is supported by the bottom surface of the large diameter hole E11.

A hole 14A is formed in the base member 14 to pass through the base member 14. The hole 14A is in communication with the cavity formed in the second support member 12. A radial dimension of the hole 14A is equal to, or substantially equal to, a radial dimension of the cavity formed in the second support member 12. In addition, the radial dimension of the first support member 11 is smaller than the radial dimension of the cavity formed in the second support member 12 and the radial dimension of the hole 14A.

In the first direction, a cavity is further formed on the lower side of the first support device 10. In a certain example, the small diameter hole E12 with the bottom surface is formed below the bottom surface of the large diameter hole E11. A radial dimension of the small diameter hole E12 is smaller than a radial dimension of the large diameter hole E11. A lower end portion P11 of the first utility pole P1 is provided inside the small diameter hole E12. A gap is formed between the lower end portion P11 and an inner surface of the small diameter hole E12. That is, the lower end portion P11 does not contact the inner surface of the small diameter hole E12.

In the second support device 20, the structure in which the second utility pole P2 is supported, the relationship between the cavity formed on the lower side of the second support device 20 (the small diameter hole E22) and the lower end portion P21 of the second utility pole P2, and the like, are the same as those of the first support device 10. For this reason, similar to the first support device 10, the second support device 20 tiltably supports the second utility pole P2, which is a utility pole to be supported. In addition, the second support device 20 rotatably supports the second utility pole P2 about an axis in the direction in which the second utility pole P2 extends.

Figure 4:
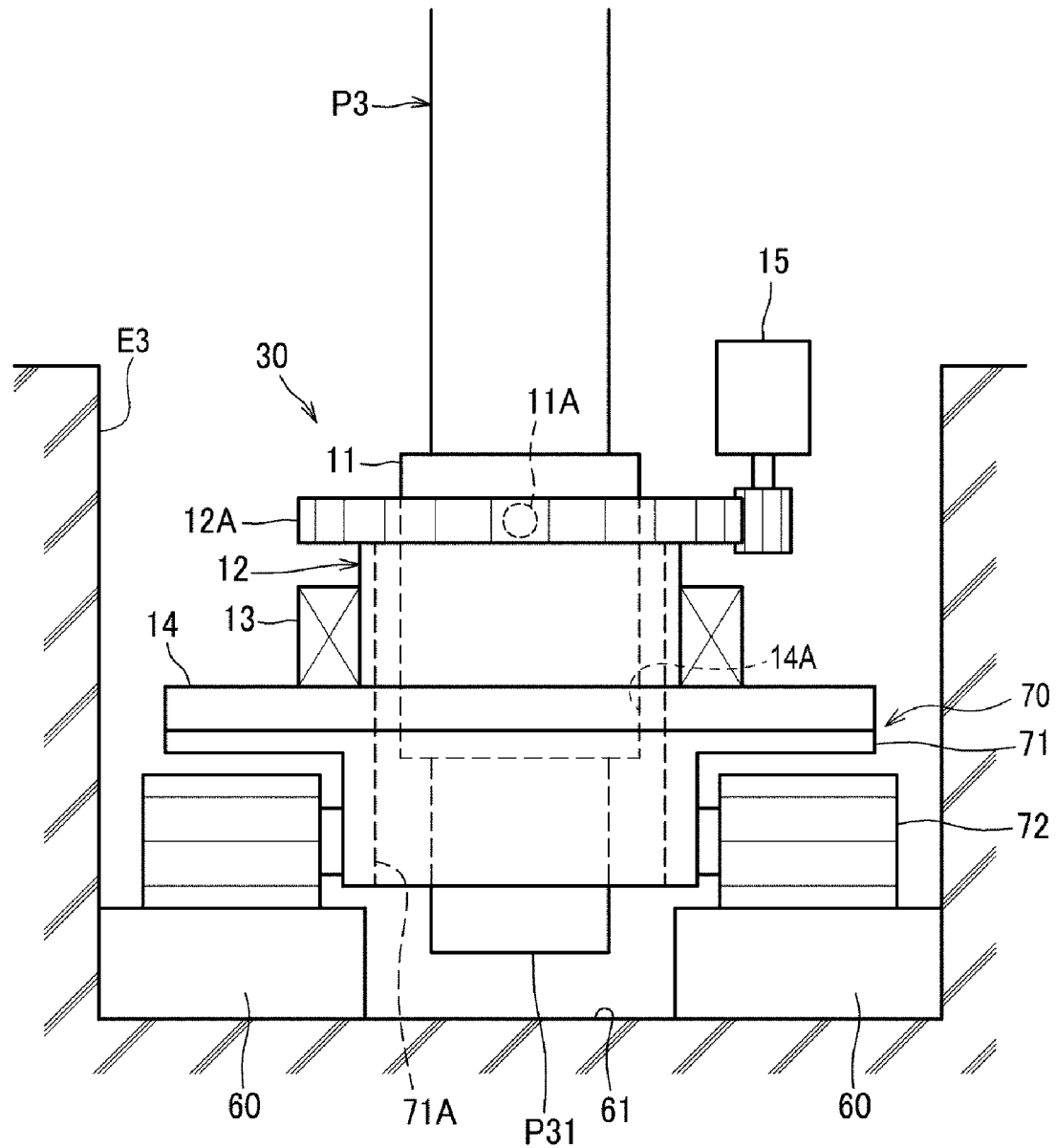
FIG. 4 is a side view illustrating a third support device, a carriage, and a rail provided in the utility pole testing apparatus according to the embodiment.

FIG. 4 is a side view illustrating the third support device 30 and the carriage 70. As described above, the third support device 30 is the same as the first support device 10 and the second support device 20. The third support device 30 is disposed within the hole E3 formed in the ground E. The rail 60 is disposed on the bottom surface of the hole E3. The carriage 70 moves along the rail 60. The carriage 70 includes a support stand 71, an endless track 72, and a drive mechanism for driving the endless track 72. Note that, in FIG. 4, the drive mechanism is not illustrated.

The carriage 70 is provided on the lower side of the third support device 30 in the first direction. The third support device 30 is provided on the support stand 71. The third support device 30 is in contact with the support stand 71 from above. The base member 14 provided on the third support device 30 is in contact with the support stand 71 from above. For this reason, the third support device 30 is supported by the carriage 70. As described above, the third support device 30 supports the third utility pole P3 as a utility pole to be supported. That is, the carriage 70 supports the third support device 30 directly in the first direction and indirectly supports the third utility pole P3.

A hole 71A is formed in the support stand 71. The hole 71A passes through the support stand 71 in the first direction. A radial dimension of the hole 71A is equal to, or substantially equal to, the radial dimension of the hole 14A formed in the base member 14. The base member 14 and the support stand 71 are disposed such that the hole 14A and the hole 71A are in communication with each other. In addition, as described above, the hole 14A is in communication with the cavity formed in the second support member 12. That is, the cavity formed in the second support member 12, the hole 14A, and the hole 71A are in communication with each other.

The lower end portion P31 of the third utility pole P3 protruding downward from the third support device 30 is inserted into the hole 71A in the first direction. The lower end portion P31 projects below the carriage 70 in the first direction. As described above, the carriage 70 is disposed above the rails 60. In addition, the lower end portion P31 is disposed in the cavity formed between the two rails 60.

The strength of the first frame body 41 and the second frame body 42 is higher than the strength of the utility poles P1 to P3. For this reason, even when a load (tension) is applied by the tensioning apparatuses 50A and 50B, the first frame body 41 and the second frame body 42 are not deformed. That is, even when a load at which the utility poles P1 to P3 are broken is applied, the first frame body 41 and the second frame body 42 are not broken. In addition, the carriage 70 has a sufficient weight. For this reason, even when a load at which the utility poles P1 to P3 are broken is applied, the carriage 70 is not separated from the rail 60 in the first direction, for example. That is, the carriage 70 does not float out of the rails 60. In a certain example, the weight of the carriage 70 is calculated based on the information related to the load applied to the utility poles P1 to P3.

In addition, the utility pole testing apparatus 1 can measure the strengths of the utility poles P1 to P3 based on information related to the loads applied to the utility poles P1 to P3. The information related to the loads applied to the utility poles P1 to P3 is detected by a sensor that can be installed in the utility pole testing apparatus 1. In addition, the utility pole testing apparatus 1 can be installed with a measuring device that measures the strengths of the utility poles P1 to P3 based on information acquired by the sensor (the detection result of the sensor). The strengths of the utility poles P1 to P3, which are the utility poles to be measured, are calculated by the measuring device.

In the utility pole testing apparatus 1 as described above, as illustrated in FIGS. 2 and 5, a path angle can be changed within a range of 90° to 180° by moving the carriage 70 along the rails 60 in the forward/rearward direction. Here, the path angle is an angle formed between the second support line L2 and the third support line L3. When the carriage 70 is moved along the second frame body 42, the second tensioning apparatus 50B (see FIG. 1) is attached to a position of the second frame body 42 corresponding to the position of the carriage 70.

When the first utility pole P1 is tilted with respect to the first direction, the first support member 11 provided on the first support device 10 is tiltably moved about the shaft 11A, and thus, the first utility pole P1 is tilted. The first utility pole P1 is tilted in any direction by pivoting the second support member 12 by using the motor 15. The second utility pole P2 and the third utility pole P3 are also tilted in the same manner as the first utility pole PT. The motor 15 and the hydraulic cylinder described above may be configured to be actuated by a remote operation.

After setting the utility poles P1 to P3 to the desired position and posture, the tensioning apparatuses 50A and 50B stretch the support lines L1 to L4. Accordingly, a force is applied to the utility poles P1 to P3, and thus, the load applied to the utility poles P1 to P3 can be known, for example, by strain gauges attached to the utility poles P1 to P3. In addition, the strengths of the utility poles P1 to P3 can be measured based on the loads applied to the utility poles P1 to P3, which are utility poles to be measured.

According to the above, in the present embodiment, the following effects are obtained.

According to the utility pole testing apparatus 1 in accordance with the present embodiment, the position of the third utility pole P3 can be changed by moving the carriage 70 along the rails 60. Accordingly, the line angle can be changed. For this reason, the utility pole testing apparatus 1 can perform testing in consideration of the external loads to be applied to the utility poles.

The first support device 10 and the second support device 20 are fixed to the ground E. That is, no rail and carriage are provided on the first support device 10 and the second support device 20. For this reason, the cost required for the utility pole testing apparatus 1 is minimized compared to a case where, for example, the rails and the carriages are provided on the first support device 10 and the second support device 20.

In the utility pole testing apparatus 1 according to the present embodiment, the second frame body 42 is extended along the rail 60. For this reason, even when the third utility pole P3 that is movable along the rail 60 is installed at any position, the fourth support line L4 attached to the third utility pole P3 is easily attached to the second frame body 42 via the second tensioning apparatus 50B.

The first tensioning apparatus 50A applies tension to the first support line L1 that is attached to the first utility pole P1. In addition, the second tensioning apparatus 50B applies tension to the fourth support line L4 that is attached to the third utility pole P3. For this reason, the tension is well applied to the support lines L1 to L4 attached to the utility poles P1 to P3.

Each of the support devices 10 to 30 tiltably supports a utility pole to be supported, which is corresponding one of the utility poles P1 to P3 and supports the utility poles to be supported so as to be rotatable by 360° about the axis in the vertical direction. For this reason, in a state in which any of the utility poles P1 to P3 are tilted in any direction of 360°, testing can be performed on the strength of the utility poles P1 to P3.

In a state in which the lower end portion (corresponding one of P11 to P31) of the utility pole to be supported, which is corresponding one of the utility poles P1 to P3, protrudes downward from each of the support devices 10 to 30, each of the support devices 10 to 30 supports the utility pole to be supported (corresponding one of P1 to P3). For this reason, compared to a case in which, for example, the lower end portion of the utility pole is supported by the support device, each of the support devices 10 to 30 can favorably support the utility poles to be supported (corresponding one of the P1 to P3). In addition, within respective lower holes (corresponding one of E12, E22, and 61) of the support devices 10 to 30, the lower end portion (corresponding one of P11 to P31) of the utility pole to be supported (corresponding one of P1 to P3) is positioned with a gap between the bottom surface and the lower end portion. For this reason, when the utility poles to be supported (corresponding one of P1 to P3) are tilted by each of the support devices 10 to 30, interference with the inner surfaces of the holes (corresponding one of E12, E22, and 61) of the lower end portion (corresponding one of P11 to P31) of the utility pole to be supported (corresponding one of P1 to P3) is prevented.

In addition, a cavity is formed by the surface defined by the rail 60 on the lower side of the third support device. For this reason, even when the third utility pole P3 is moved along the rails 60 by the carriage 70, interference between the lower end portion P31 of the third utility pole P3 and the surface defining the cavity (the hole 61) is suppressed.

Modified Example

In a certain modified example, in the two first support lines L1, tension may be applied by a predetermined tensioning apparatus to the first support line L1 on the upper side in the vertical direction, and tension may be applied by the other tensioning apparatus to the first support lines L1 disposed on the lower side. That is, tension may be applied to each of the two first support lines L1 by different tensioning apparatuses. In addition, tension may also be applied to each of the two fourth support lines L4 by different tensioning apparatuses.

In addition, the number of support lines L1 may be one or may be three or more. Similarly, each of the numbers of support lines L2 to L4 may be one or may be three or more. In this case, the utility pole bands B1, B21 and B3 are provided with an appropriate number depending on the number of support lines. In addition, in the tensioning apparatuses 50A and 50B, the movable pulley 52 and the first fixed pulley 53 are also provided with an appropriate number depending on the number of support lines. The wire W is attached to the frame body by being appropriately wound on the movable pulley 52 and the first fixed pulley 53 so that tension is applied to the support line.

In the embodiment described above, the rail 60 and the carriage 70 are provided only for the third support device 30, but in the three support devices 10 to 30, rails and carriages may be provided for two or more support devices, respectively. That is, two or more utility poles may be provided in a movable manner.

In addition, the tensioning apparatus may also be, for example, an electric winch that applies tension directly to the support line. In addition, the tensioning apparatus may be provided on only one of the first and second frame bodies, and one end of the support line of the utility pole may be directly connected to the other frame body without passing through the tensioning apparatus. The carriage may be, for example, a carriage movable by a wheel. Furthermore, the support device may only support the utility pole while the utility pole is extended straight in the vertical direction, for example. In this case, the utility poles are unable to tilt.

It is to be noted that the present disclosure is not limited to the aforementioned embodiments and can be variously modified in the implementation stage without departing from the gist of the present disclosure. An appropriate combination of the embodiments can also be implemented, in which a combination of their effects can be obtained. Further, the above embodiments include various disclosures, which can be designed by combining constituent elements selected from a plurality of constituent elements disclosed here. For example, a configuration in which some constituent elements are removed from all the constituent elements illustrated in the embodiments can be designed as a disclosure if the problems can be solved and the effects can be achieved.

The invention claimed is:

1. A utility pole testing apparatus comprising:
   three or more utility poles including a first utility pole, a second utility pole, and a third utility pole;
   a support line that is stretched between the first utility pole and the second utility pole and is stretched between the second utility pole and the third utility pole;
   a rail extended in a direction that intersects both a direction in which the three or more utility poles extend and a direction in which the support line is stretched between the first utility pole and the second utility pole; and
   a carriage configured to support the third utility pole, the carriage being movably provided along the rail together with the third utility pole.

2. The utility pole testing apparatus according to claim 1, further comprising:
   a first frame body to which the support line is stretched between the first utility pole and the first frame body, and
   a second frame body to which the support line is stretched between the third utility pole and the second frame body, the second frame body being extended along the rail.

3. The utility pole testing apparatus according to claim 2, comprising:
   a first tensioning apparatus configured to apply tension to a portion of the support line connected to the first utility pole; and
   a second tensioning apparatus configured to apply tension to a portion of the support line connected to the third utility pole.

4. The utility pole testing apparatus according to claim 2, further comprising:
   a first support device configured to support the first utility pole as a utility pole to be supported, a second support device configured to support the second utility pole as a utility pole to be supported, and a third support device configured to support the third utility pole as a utility pole to be supported, wherein
   each of the first support device, the second support device, and the third support device supports a corresponding utility pole of the first utility pole, the second utility pole, and the third utility pole to be supported
   tiltably in a direction intersecting a direction in which the corresponding utility pole to be supported extends and
   rotatably about an axis in the direction in which the corresponding utility pole to be supported extends.

5. The utility pole testing apparatus according to claim 4, wherein
   a cavity is formed on a lower side of each of the first support device, the second support device, and the third support device;
   each of the first support device, the second support device, and the third support device supports the corresponding utility pole to be supported in a state in which a lower end portion of the corresponding utility pole to be supported protrudes downward and the lower end portion of the corresponding utility pole to be supported is located inside the cavity; and
   a gap is formed in the cavity on the lower side of each of the first support device, the second support device, and the third support device, between the lower end portion of the corresponding utility pole to be supported and a surface defining the cavity.

6. The utility pole testing apparatus according to claim 5, wherein,
   in the cavity on the lower side of the third support device, a part of the surface defining the cavity is formed by the rail, and
   the cavity on the lower side of the third support device is formed along the rail.

7. The utility pole testing apparatus according to claim 1, wherein
   a strength of each of the first and second frame bodies with respect to a load is higher than that of each of the three or more utility poles.

8. The utility pole testing apparatus according to claim 1, comprising:
   a sensor configured to detect a load to be applied to a utility pole to be measured, which is any one of the three or more utility poles, and
   further comprising a measuring device configured to measure a strength of the utility pole to be measured based on a detection result from the sensor.

* * * * *